United States Patent
Huang et al.

(10) Patent No.: US 10,146,215 B2
(45) Date of Patent: Dec. 4, 2018

(54) MONITOR SYSTEM AND METHOD FOR SEMICONDUCTOR PROCESSES

(71) Applicant: Taiwan Semiconductor Manufacturing Company Limited, Hsinchu (TW)

(72) Inventors: Chih-Wei Huang, Hsinchu (TW); Feng-Ning Lee, Taoyuan County (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 374 days.

(21) Appl. No.: 14/091,444

(22) Filed: Nov. 27, 2013

(65) Prior Publication Data

US 2015/0148933 A1    May 28, 2015

(51) Int. Cl.
*G05B 19/418* (2006.01)
*G05B 23/02* (2006.01)

(52) U.S. Cl.
CPC .......... *G05B 19/418* (2013.01); *G05B 23/024* (2013.01); *G05B 2219/32191* (2013.01); *G05B 2219/42001* (2013.01); *G05B 2219/45031* (2013.01); *Y02P 90/02* (2015.11); *Y02P 90/22* (2015.11)

(58) Field of Classification Search
CPC ................ G05B 19/418; G05B 23/024; G05B 2219/42001; G05B 2219/32191; G05B 2219/45031; Y02P 90/22; Y02P 90/02
See application file for complete search history.

(56) References Cited

U.S. PATENT DOCUMENTS 5,427,878 A * 6/1995 Corliss ............... G01B 11/0683
                                                            356/436
5,586,041 A * 12/1996 Mangrulkar ............ B30B 15/26
                                                            700/110

(Continued)

FOREIGN PATENT DOCUMENTS

EP          1058175 B1     10/2005

OTHER PUBLICATIONS

Relihan, Keelin, Geraghty, Shane, O'Dwyer, Aidan; Some Aspects of Process Control in Semiconductor Manufacturing; Proceedings of the 24th International Manufacturing Conference; pp. 1097-1104; 2007.

*Primary Examiner* — Kenneth M Lo
*Assistant Examiner* — David J Wynne
(74) *Attorney, Agent, or Firm* — Jones Day

(57) ABSTRACT

A method for monitoring a process in a semiconductor processing facility and a monitor system are provided. A plurality of wafers are processed according to a process. Data on the processing is collected, and the collecting includes, for each wafer of the plurality of wafers, determining that a processing event has occurred, and recording a time associated with the processing event. An amount of time between the recorded times is calculated for consecutively processed wafers. A set of control limits for the process is determined based on the calculated amounts of time. The set of control limits define a range of acceptable values for the amount of time. Second wafers are processed according to the process. A problem in the processing of the second wafers is identified based on the set of control limits. The problem is identified as the second wafers are being processed.

20 Claims, 8 Drawing Sheets

(56) References Cited

U.S. PATENT DOCUMENTS

| | | | | |
|---|---|---|---|---|
| 5,862,054 A | * | 1/1999 | Li | G05B 19/41875 700/108 |
| 6,947,801 B2 | * | 9/2005 | Lin | G05B 19/41865 700/108 |
| 2003/0236585 A1 | * | 12/2003 | Kao | G05B 19/41865 700/108 |
| 2008/0071405 A1 | * | 3/2008 | Liu | G03F 7/26 700/108 |

* cited by examiner

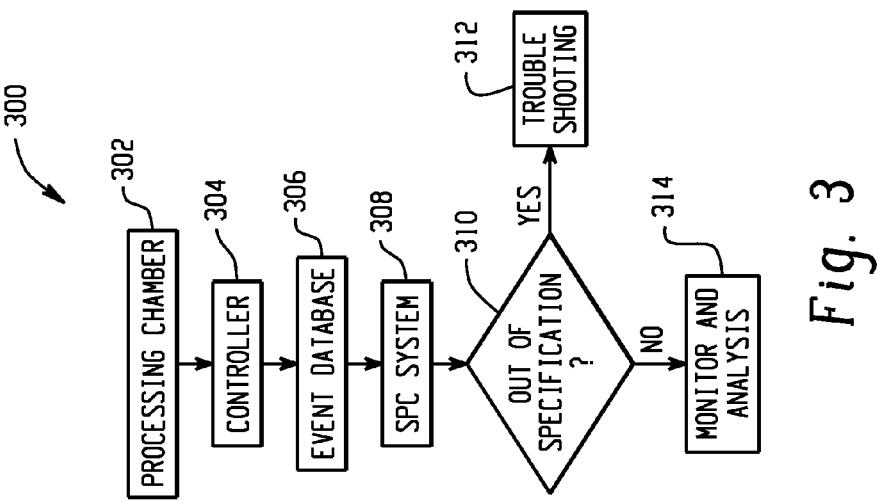
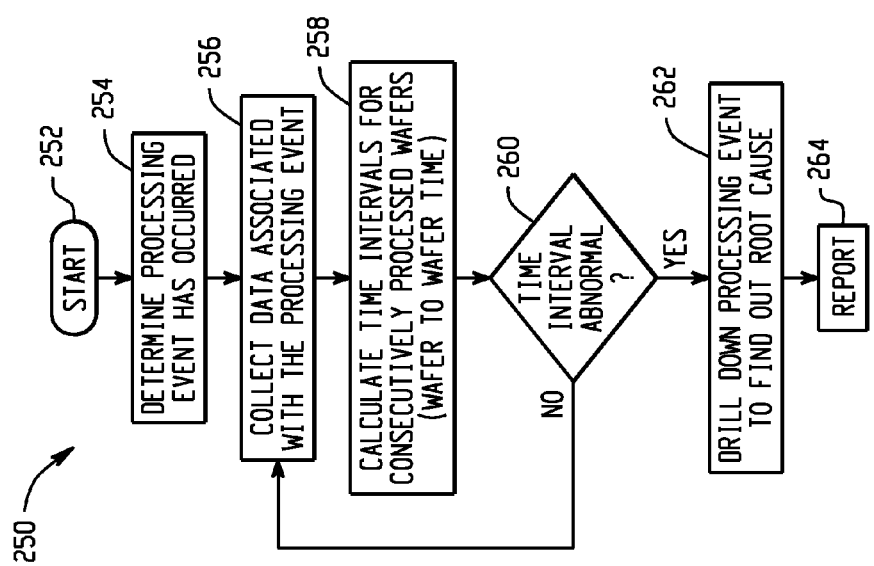
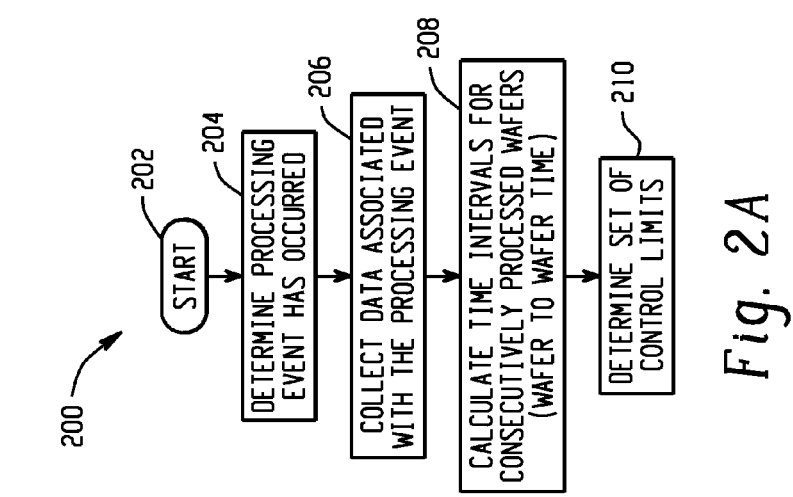
Fig. 3
Fig. 2B
Fig. 2A

MONITOR SYSTEM AND METHOD FOR SEMICONDUCTOR PROCESSES

TECHNICAL FIELD

The technology described in this disclosure relates generally to semiconductor processing and more particularly to a system and method for monitoring a process in a semiconductor processing facility.

BACKGROUND

A semiconductor device such as an integrated circuit (IC) may include electronic circuit elements (e.g., transistors, diodes, resistors) fabricated on a single body of semiconductor material. The electronic circuit elements may be connected through conductive connectors to form a complete circuit that can contain millions of individual circuit elements. Integrated circuits may be fabricated from semiconductor wafers in a process that includes a sequence of processing steps. The process, which may be referred to as wafer fabrication, may include operations such as oxidation, etch mask preparation, etching, material deposition, planarization, and cleaning. An important metric of the wafer fabrication process may be the throughput of the process (e.g., a number of wafers that can be processed in an amount of time).

BRIEF DESCRIPTION OF THE FIGURES

FIG. 2A is an example flowchart illustrating an example method for determining a set of control limits for an SPC system.

FIG. 2B is an example flowchart illustrating an example method for identifying and reporting a throughput problem in a semiconductor processing facility.

FIG. 3 is an example flowchart illustrating an architecture for collection of processing events in a monitor system.

DETAILED DESCRIPTION

Figure 1A:
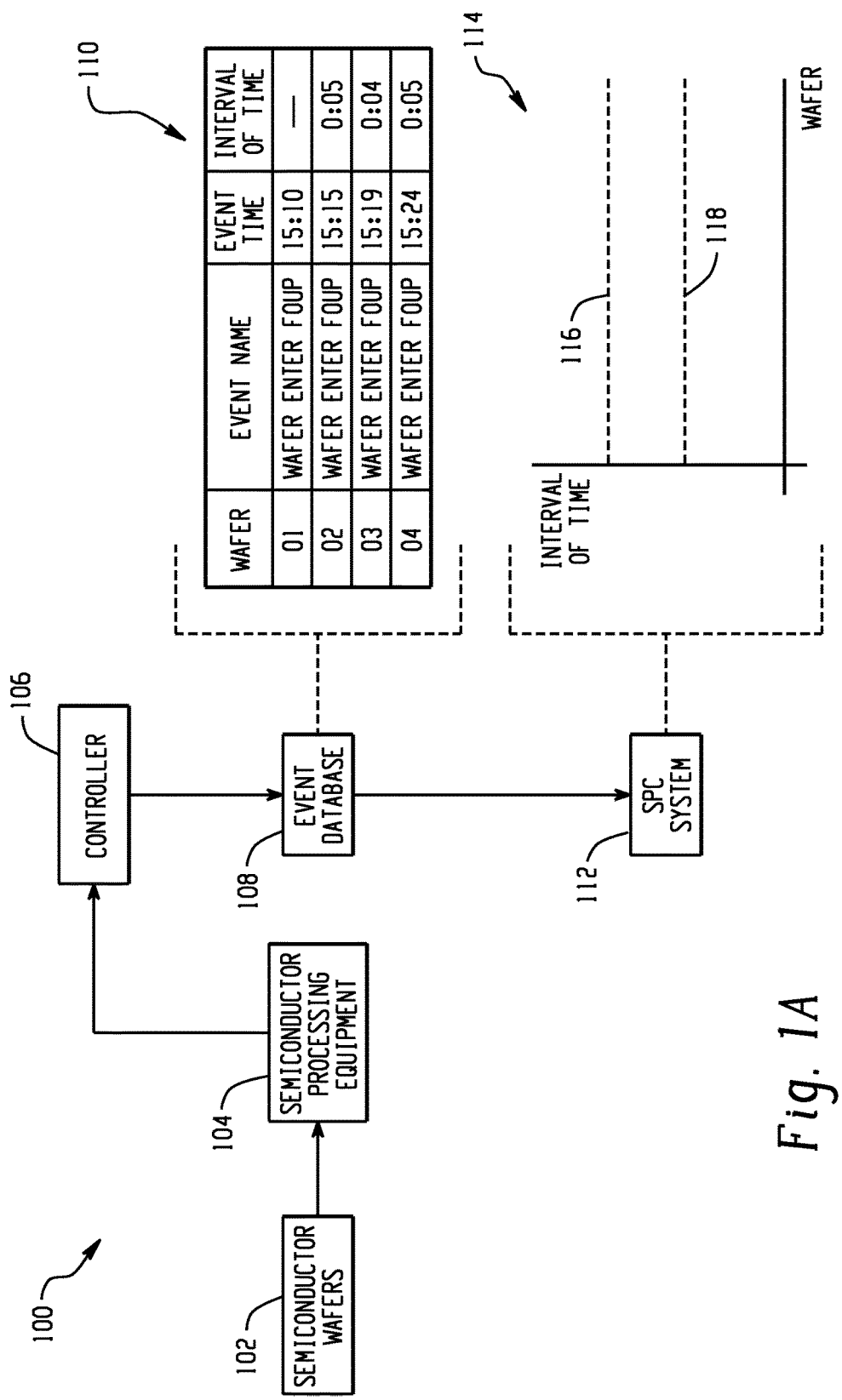
FIG. 1A depicts an example system for a semiconductor processing facility, where the system collects data at a controller in order to set up a statistical process control (SPC) system.

FIG. 1A depicts an example system 100 for a semiconductor processing facility, where the system 100 collects data at a controller 106 in order to set up a statistical process control (SPC) system 112. In the example of FIG. 1A, the semiconductor processing facility may include semiconductor processing equipment 104 that is configured to process a plurality of semiconductor wafers 102 according to a process. The semiconductor processing equipment 104 may include, for example, one or more processing chambers for processing the plurality of semiconductor wafers 102. For example, the processing at the semiconductor processing equipment 104 may include performing an epitaxial growth process, performing a deposition process, and etching features on the semiconductor wafers 102, among other processes. The semiconductor processing facility may further include the controller 106 that is configured to collect data on the processing of the plurality of wafers 102 in the semiconductor processing equipment 104. The controller 106 may comprise various forms and may comprise hardware or software configured to receive inputs from various components of the semiconductor processing facility and to generate outputs that may be used in controlling or monitoring a semiconductor fabrication process.

The controller 106 may collect data on the processing of each wafer of the plurality of semiconductor wafers 102 in the semiconductor processing equipment 104. Specifically, for each wafer of the plurality of wafers 102, the controller 106 may collect i) data indicating that a processing event has occurred, and ii) data including a time associated with the processing event. The wafers of the plurality of semiconductor wafers 102 may be processed in a consecutive, serial process. For example, the process may be performed on a first wafer of the plurality of wafers 102, and then the same process may be performed on a second wafer of the plurality of wafers 102, until each wafer of the plurality of wafers 102 has been subjected to the same process.

An event database 108 may be configured to store the data collected by the controller 106. The event database 108 may further be configured to store a wafer-to-wafer interval time for consecutively processed wafers of the plurality of semiconductor wafers 102. The wafer-to-wafer interval time may be an amount of time between an occurrence of the processing event for wafers of the plurality of wafers 102 that have been processed consecutively, and the wafer-to-wafer interval time may be determined based on the data that is collected at the controller 106 (e.g., the times that are associated with the processing event). For example, the processing event may be a completion of the process, such that the wafer-to-wafer interval time may measure an amount of time required to complete the process for a single wafer. In another example, where the process comprises a plurality of steps, the wafer-to-wafer interval time may measure an amount of time between completion of a particular step for consecutively processed wafers. In this example, the wafer-to-wafer interval time may measure an amount of time required to perform the particular step for a single wafer.

An example of the data stored in the event database 108 may be illustrated in a table 110 of FIG. 1A. The table 110 may include four columns, where the columns include a wafer identification column, an event name column, an event time column, and an interval of time column. In the example of FIG. 1A, four wafers (e.g., wafers "01," "02," "03," and "04," as identified in the wafer identification column) may be processed in a serial, consecutive manner, with the wafer "01" being processed immediately before the wafer "02," and so on. For each of the four wafers, the event time column may record a time associated with a "Wafer Enter FOUP" processing event (e.g., a processing event where a wafer enters a Front Operating Unified Pod). The interval of time column may record the wafer-to-wafer interval time described above, where the wafer-to-wafer interval time may be an amount of time between an occurrence of the "Wafer Enter FOUP" processing event for the consecutively processed wafers. For example, as depicted in the table 110, the "Wafer Enter FOUP" event may occur at a time of "15:10" for the wafer "01" and at a time of "15:15" for the wafer "02," such that the wafer-to-wafer interval time may be "0:05."

The example system 100 may further include the statistical process control (SPC) system 112. The SPC system 112 may be configured to determine a set of control limits for the process based on the wafer-to-wafer interval times. The set of control limits may define a range of acceptable values for the wafer-to-wafer interval time. The SPC system 112 may be configured to apply one or more statistical techniques to develop the set of control limits, and the set of control limits may be used by the SPC system 112 to develop a control chart. After determining the set of control limits, the SPC system 112 may be used to monitor, control, and improve semiconductor processing through the use of the set of control limits and additional statistical analysis (e.g., as described below, with reference to FIG. 1B).

An example control chart 114 may be illustrated in FIG. 1A. In the example control chart 114 for the SPC system 112, an x-axis may represent different wafers of the semiconductor wafers 102. For example, the wafers "01," "02," "03," and "04" included in the table 110 may each be represented at a particular tick mark on the x-axis. A y-axis may represent an interval of time, where the interval of time may be the wafer-to-wafer interval time for the different wafers of the x-axis. The control chart 114 may include an upper control limit 116 and a lower control limit 118, where the upper and lower control limits 116, 118 may define the set of control limits for the process. When data is plotted on the control chart 114 (e.g., as depicted in FIG. 1B), acceptable values for the wafer-to-wafer interval time may be those values that are greater than the lower control limit 118 but less than the upper control limit 116.

Figure 1B:
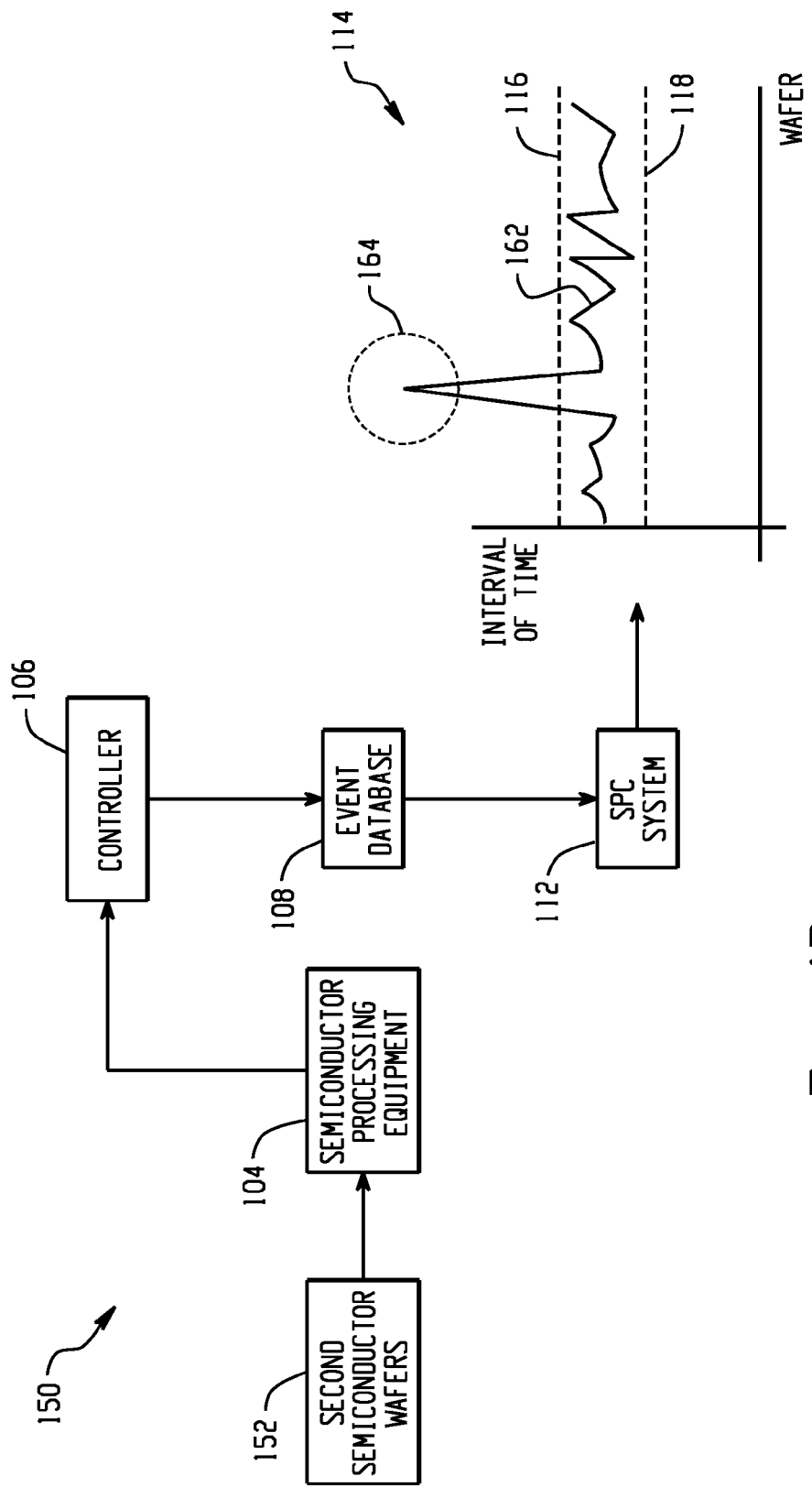
FIG. 1B depicts an example monitor system, where an SPC system is used to identify a throughput problem in a processing of semiconductor wafers.

FIG. 1B depicts an example monitor system 150, where the SPC system 112 is used to identify a throughput problem in a processing of second semiconductor wafers 152. In the example system 100 of FIG. 1A, data may be collected on the processing of the plurality of semiconductor wafers 102, where the collected data may be used by the SPC system 112 to determine the set of control limits (e.g., the upper and lower control limits 116, 118). By contrast, in the example monitor system 150 of FIG. 1B, the determined set of control limits 116, 118 may be used to monitor the processing of the second semiconductor wafers 152 and to identify the throughput problem in the processing. Thus, aspects of the system 100 of FIG. 1A may be used in setting up the SPC system 112, while aspects of the monitor system 150 of FIG. 1B may be used in applying the SPC system 112 for monitoring purposes. Specifically, as described below, the SPC system 112 may be used to monitor a semiconductor fabrication process in a real time manner.

In the example of FIG. 1B, the monitor system 150 may include the semiconductor processing equipment 104 that is configured to process the second semiconductor wafers 152 according to the process. The monitor system 150 may further include the controller 106 that is configured to collect second data on the processing of the second semiconductor wafers 152 in the semiconductor processing equipment 104. For each wafer of the second wafers 152, the controller 106 may collect the second data that includes: i) data indicating that the processing event has occurred, and ii) data including the time associated with the processing event. The event database 108 may be configured to store the collected second data for the second semiconductor wafers 152 and a wafer-to-wafer interval time for consecutively processed wafers of the second semiconductor wafers 152 (e.g., as determined by taking a difference between the stored times for the consecutively processed wafers of the second semiconductor wafers 152).

The SPC system 112 may monitor the data stored in the event database 108, including the wafer-to-wafer interval times for the second semiconductor wafers 152. The SPC system 112 may identify a problem in the processing of the second semiconductor wafers 152 based on the wafer-to-wafer interval times and the set of control limits 116, 118 determined in the example system 100 of FIG. 1A. For example, after determining the upper control limit 116 and the lower control limit 118 that may comprise the set of control limits (e.g., as described above with reference to FIG. 1A), the problem in the processing of the second semiconductor wafers 152 may be identified by comparing the wafer-to-wafer interval times for the second wafers 152 to the set of control limits 116, 118.

The identification of the problem in the processing of the second wafers 152 may be illustrated by plotting the wafer-to-wafer interval times for the second wafers 152 on the control chart 114, as illustrated in FIG. 1B. The x-axis of the control chart 114 may represent different wafers of the second semiconductor wafers 152, and the y-axis may represent an interval of time, where the interval of time may be the wafer-to-wafer interval time for the wafers of the x-axis. Data 162 plotted on the graph may represent the wafer-to-wafer interval times for the second wafers 152. The control chart 114 may include the upper control limit 116 and the lower control limit 118 determined in the example system 100 of FIG. 1A, where the upper and lower control limits 116, 118 may define a range of acceptable values for the wafer-to-wafer interval time. To identify the problem in the processing of the second wafers 152 using the control chart 114, the wafer-to-wafer interval times for the wafers 152 may be compared to the control limits 116, 118. For example, in the example of FIG. 1B, the comparison may indicate a problem 164, where the wafer-to-wafer interval time is outside of the control limits 116, 118.

Figure 1C:
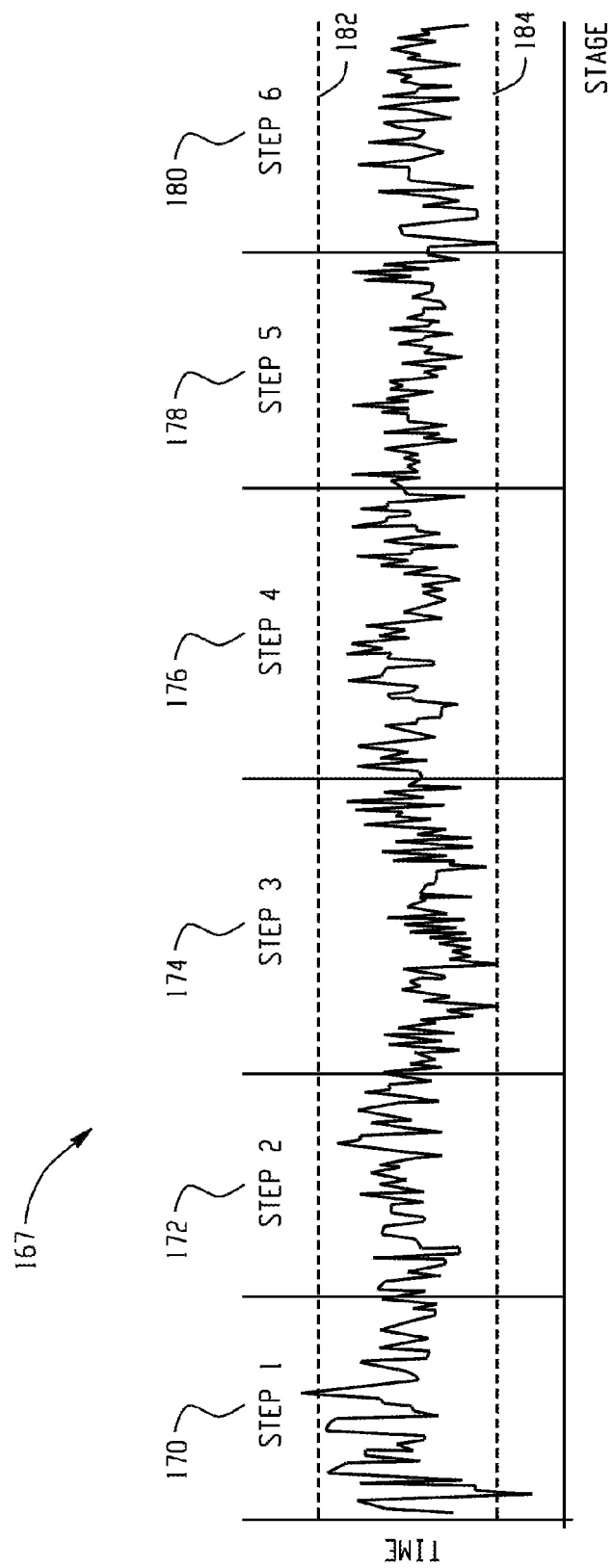
FIG. 1C depicts an example graph, where the example graph depicts data plotted at a higher granularity.

FIG. 1C depicts an example graph 167, where the graph 167 depicts the second data at a higher granularity. When a problem in the processing of the second wafers 152 is identified, further information on the problem may be gathered by considering the second data collected at the controller 106 at the higher granularity. As described above, the second semiconductor wafers 152 may be processed according to the process. In processing a single wafer of the second semiconductor wafers 152 according to the process, the processing may include a plurality of steps 170, 172, 174, 176, 178, 180. In the example graph 167 of FIG. 1C, a time required for completing various stages of the process may be plotted for each of the plurality of steps 170, 172, 174, 176, 178, 180. Thus, an x-axis of the graph 167 may represent various stages in the processing of a single wafer of the second semiconductor wafers 152, and a y-axis may represent an amount of time required for completing each of the stages.

In the control chart 114 of FIG. 1B, wafer-to-wafer interval times may be depicted for each of the second wafers 152. By contrast, in the example graph 167 of FIG. 1C, the processing of a single wafer of the second wafers 152 may be considered, with data being included for each of the different steps 170, 172, 174, 176, 178, 180 that are used in processing the single wafer. Thus, the control chart 114 may depict the second data collected for the second semiconductor wafers 152 at a "macro level," and the example graph 167 may depict the second data at a "micro level." The micro level depiction of the second data may allow for consideration of the second data at the higher granularity as compared to the macro level depiction.

Using the micro level depiction of the second data in the example graph 167, a bottleneck step for the process may be identified. The bottleneck step may be a particular step of the plurality of steps 170, 172, 174, 176, 178, 180 that limits a throughput of the process more than all of the other steps of the plurality of steps 170, 172, 174, 176, 178, 180. The bottleneck step may be identified by considering the elapsed time (i.e., as plotted on the y-axis of the graph 167) for the various stages of the processing of the single wafer. For example, as depicted in the example of FIG. 1C, upper and lower control limits 182, 184 may be determined for the graph 167, and elapsed amounts of time that are outside of the range of acceptable values defined by the control limits 182, 184 may be used in identifying the bottleneck step. In the example of FIG. 1C, the first step 170 may be the bottleneck step, as indicated by the elapsed time that exceeds the upper control limit 182.

In the example of FIGS. 1A and 1B, the controller 106 may collect data from the semiconductor processing equipment 104 on a real time basis. The SPC system 112 may use the real time data such that the problem may also be identified on a real time basis (e.g., the problem may be identified contemporaneously with the processing of the second wafers 152). Thus, the system 100 of FIG. 1A and the monitor system 150 of FIG. 1B may enable real time detection of the process time performance of the semiconductor processing equipment 104. Such real time detection may be in contrast to methods used in conventional systems. In such conventional systems, real time detection may not be used, and instead, daily production reports or offline analysis tools may be used to determine a throughput of a fabrication system. The use of the daily production reports or the offline analysis tools may make it difficult to check the throughput performance of the fabrication system at any particular point in time. Further, in the conventional systems, lacking the real time detection capabilities of the system 100 and monitor system 150 of FIGS. 1A and 1B, it may be impossible to check throughput performance while processing different recipes or condition changes.

In the example of FIGS. 1A-1C, the setup of the SPC system 112 (i.e., as depicted in FIG. 1A) and the use of the SPC system 112 for monitoring throughput (i.e., as depicted in FIGS. 1B and 1C) may be depicted as being separate and distinct steps. However, in other examples, the setup and use of the SPC system 112 for monitoring purposes may be performed substantially simultaneously. In such other examples, the setup and use of the SPC system 112 may not be separate and distinct steps (e.g., the set of control limits may be determined via a dynamic process and may be changed during the monitoring of the throughput). It is further noted that although the controller 106, event database 108, and SPC system 112 may be depicted as being separate entities in the example of FIGS. 1A and 1B, in other examples, these components may be integrated and combined within a single device. The single device may be, in an example, computer hardware or software that is able to collect data, store and process the collected data, and perform process monitoring based on determined control limits.

FIG. 2A is an example flowchart 200 illustrating an example method for determining a set of control limits for an SPC system, and FIG. 2B is an example flowchart 250 illustrating an example method for identifying and reporting a throughput problem in a semiconductor processing facility. As described above, with reference to FIGS. 1A-1C, the use of an SPC system may be seen as including a "set up" phase and a "monitoring" phase. For example, as described above, aspects of the system 100 of FIG. 1A may be used in setting up the SPC system 112, while aspects of the monitor system 150 of FIG. 1B may be used in applying the SPC system 112 for monitoring purposes. Steps of the set up phase and the monitoring phase may be depicted in FIGS. 2A and 2B, respectively.

In FIG. 2A, at 202, a start of the set up phase may occur. The start of the set up phase may include starting a processing of a plurality of wafers according to a process. At 204, it may be determined that a processing event has occurred, where the processing event may be related to a particular, single wafer of the plurality of wafers. In an example, the processing event may be a "Wafer Enter FOUP" event (e.g., a processing event where the particular, single wafer of the plurality of wafers enters a Front Operating Unified Pod). In other examples, the processing event may be a beginning of a processing step for the particular, single wafer, or the processing event may be an end of a processing step for the particular, single wafer.

At 206, data associated with the processing event may be collected. Specifically, the collected data may include a time associated with the processing event, such as a time in which the processing event occurred, a time in which the processing event began, or a time in which the processing event ended. In an example, the data is collected at a controller of a semiconductor processing facility. Thus, following step 206, a wafer of the plurality of wafers may be associated with a recorded time value, where the recorded time value may be indicative of when the processing event occurred for the wafer.

At 208, using the collected time values for each of the wafers, wafer-to-wafer interval times may be calculated. The wafer-to-wafer interval time may be an amount of time between the recorded time values for consecutively processed wafers. For example, if a recorded time value for a first wafer indicates that the processing event occurred at a time of "15:10" for the first wafer, and a recorded time value for a second wafer indicates that the processing event occurred at a time of "15:15" for the second wafer, then a wafer-to-wafer interval time may be calculated to be "0:05."

At 210, based on the calculated wafer-to-wafer interval times, a set of control limits for the process may be determined. The set of control limits may define a range of acceptable values for the wafer-to-wafer interval time, where values outside of the range of acceptable values may indicate a throughput problem in the process.

In FIG. 2B, at 252, a start of the monitoring phase may occur. The start of the monitoring phase may include starting a processing of a second plurality of wafers according to the process. At 254, it may be determined that the processing event has occurred. As described above, with reference to FIG. 2A, the processing event may be related to a particular, single wafer of the second plurality of wafers (e.g., the processing event may be a "Wafer Enter FOUP" event for the particular, single wafer). At 256, data associated with the processing event may be collected. Specifically, the collected data may include a recorded time value associated with the processing event for each of the wafers of the second plurality of wafers (e.g., a time in which the processing event occurred for a single wafer of the second plurality of wafers). At 258, using the collected time values for each wafer of the second plurality of wafers, wafer-to-wafer interval times may be calculated.

At 260, it may be determined whether a calculated wafer-to-wafer interval time is abnormal. The wafer-to-wafer interval time may be determined to be abnormal if it is outside of the set of control limits determined at step 210 of flowchart 200. If the wafer-to-wafer time is not abnormal, the flowchart 250 may return to the steps 256 and 258, where additional data associated with the processing event may be collected and additional wafer-to-wafer interval times may be calculated, respectively.

If the wafer-to-wafer time is determined to be abnormal, at 262, collected data for the processing event may be considered at a higher granularity (e.g., a "drill down" step may be performed) in order to determine a cause of the abnormality. As described above, with reference to FIG. 1C, the consideration of the collected data at the higher granularity may enable individual processing steps in the processing of a single wafer to be considered. This may be in contrast to the use of more coarse data, which may only allow consideration of wafer-to-wafer interval times. By considering the collected data at the higher granularity, a bottleneck step for the process may be identified, where the bottleneck step may be a particular step in the processing of a single wafer that limits a throughput of the process more than all of the other steps of the process.

Additionally, if the wafer-to-wafer time is determined to be abnormal, at 264, the abnormality or a cause of the abnormality may be reported. The reporting may be on a real time basis, which may thus allow for real time detection of the semiconductor processing equipment's performance. In an example, an alert signal may be output to report the abnormality, where the alert signal may indicate that a throughput problem has been identified. The alert signal may be output contemporaneously with the occurrence of the throughput problem, and the alert signal may be received by another component of the system.

FIG. 3 is an example flowchart 300 illustrating an architecture for collection of processing events in a monitor system. At 302, a plurality of wafers may be processed according to a process in a processing chamber. At 304, a controller may collect data on the processing, where the collected data may be indicative of an amount of processing time required for processing wafers of the plurality of wafers. At 306, the collected data may be stored in an event database or in another data storage system (e.g., a memory, register, disk drive, etc.). The event database may further be configured to calculate and store a wafer-to-wafer interval time (e.g., an amount of time between an occurrence of a processing event for consecutively processed wafers of the plurality of wafers).

At 308, the data stored in the event database may be processed by a statistical process control (SPC) system. The SPC system may process the stored data in order to determine a set of control limits for the process, where the set of control limits may define a range of acceptable values for the wafer-to-wafer interval time. In situations where the SPC system is being used in a monitoring capacity (e.g., where the set of control limits has already been determined), the SPC system may process the stored data to identify a throughput problem in the processing of the plurality of wafers.

At 310, in order to identify the throughput problem, it may be determined if a wafer-to-wafer interval time is outside of the set of control limits (i.e., it may be determined whether the wafer-to-wafer time is outside of specifications). If the wafer-to-wafer interval time is outside of the set of control limits, this may be indicative of the throughput problem. Because the processing data may be collected at the controller as it is generated, in a real time manner, the throughput problem may also be detected and reported in a real time manner. If the wafer-to-wafer interval time is outside of the set of control limits, at 312, troubleshooting may be performed. If the wafer-to-wafer interval time is within the set of control limits, at 314, further monitoring and analysis of collected data may be performed.

Figure 4:
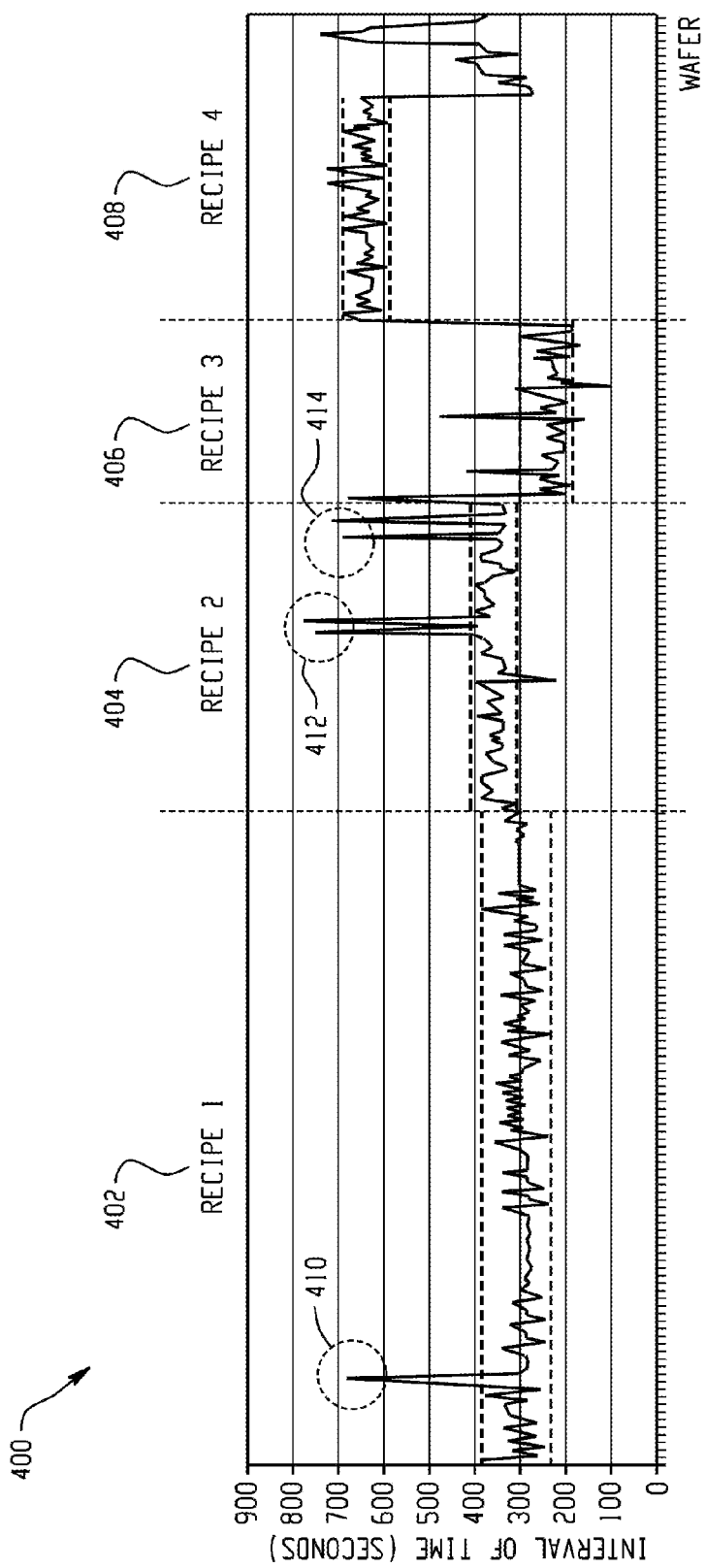
FIG. 4 is an example output graph of an SPC system, where the output graph includes multiple sets of control limits, with each set of the multiple sets being associated with a different process recipe.

FIG. 4 is an example output graph 400 of an SPC system, where the output graph 400 includes multiple sets of control limits, with each set of the multiple sets being associated with a different process recipe. An x-axis of the graph 400 may represent different wafers of a plurality of semiconductor wafers. For example, each of the wafers of the plurality of wafers may be represented at a particular tick mark on the x-axis. A y-axis may represent an interval of time (e.g., a time in seconds, as in the example of FIG. 4), where the interval of time may be the wafer-to-wafer interval time for the different wafers of the x-axis.

The graph 400 may further include four regions 402, 404, 406, 408, where each of the four regions corresponds to a different recipe used in processing the plurality of wafers. As illustrated in the graph 400, each of the four regions 402, 404, 406, 408 may include a different set of control limits, where the control limits may be shown by the horizontal dashed lines. In another example, each of the four regions may correspond to a different chamber used in the processing of the plurality of wafers. Thus, in the example of FIG. 4, when data is collected on the processing of the plurality of wafers, the wafer-to-wafer interval times may be plotted in the graph 400 for each of the different recipes or chambers. Wafer-to-water interval times outside of the control limits for each recipe or chamber may be indicative of problems in throughput for a particular recipe or chamber. For example, wafer-to-wafer interval times that may be indicative of throughput problems are highlighted at 410, 412, and 414 in FIG. 4. Using data plotted on the graph 400, an "outside of control limits" rate may be calculated, where the rate may be equal to a number of counts that are outside of the set of control limits divided by a total number of wafer counts.

Figure 5:
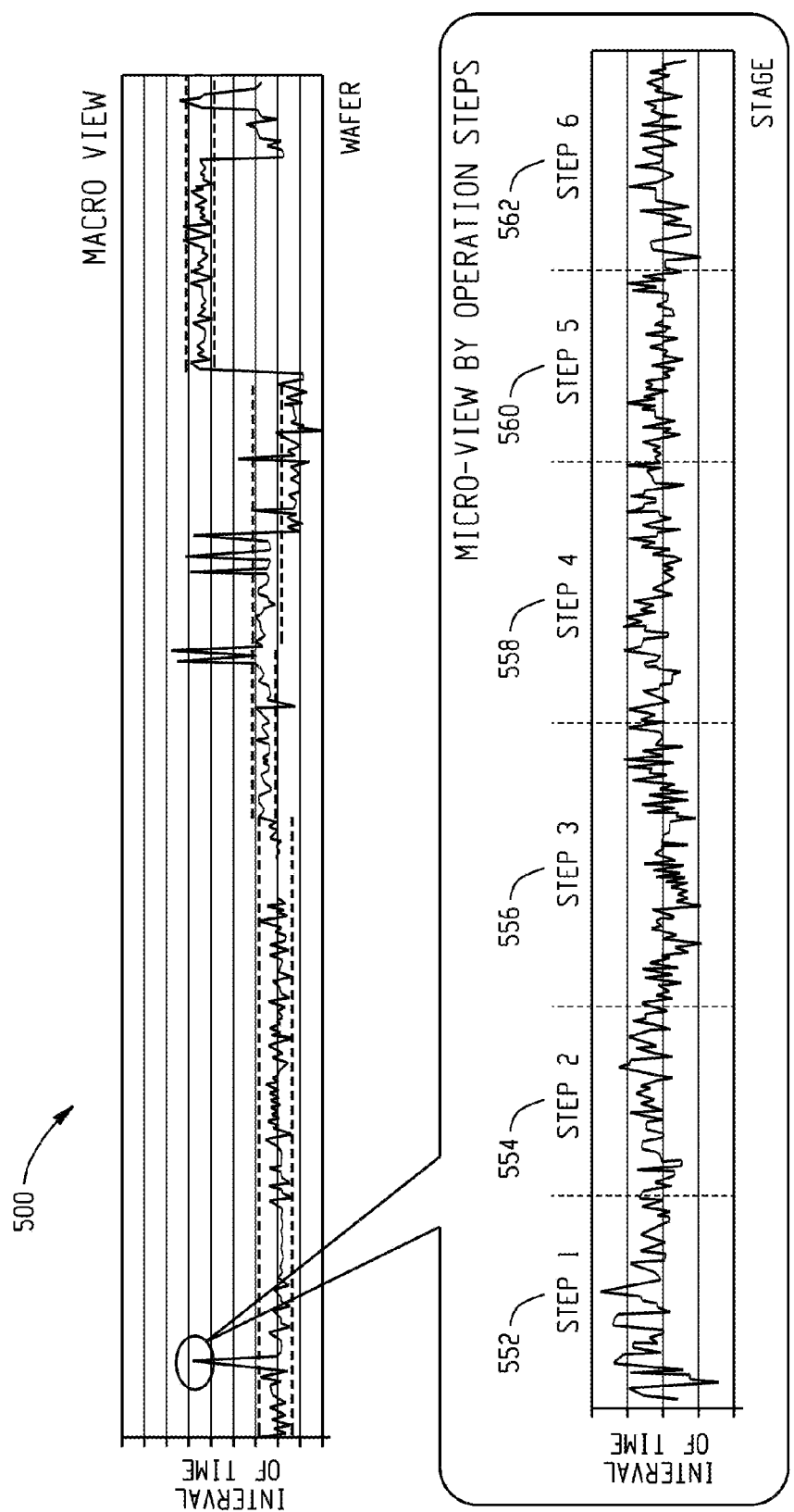
FIG. 5 depicts example output graphs of an SPC system, where the output graphs depict collected data at a macro level and at a micro level, respectively.

FIG. 5 depicts example output graphs 500, 550 of an SPC system, where the output graphs 500, 550 depict collected data at a macro level and at a micro level, respectively. When a throughput problem is identified based on a wafer-to-wafer interval time being outside of a determined set of control limits, a subsequent "drill down" operation may be performed to determine a particular processing step that may be causing the throughput problem. Such a drill down operation may be illustrated in FIG. 5.

When the throughput problem is identified, further information on the problem may be gathered by considering data collected at a controller at a higher granularity (e.g., by "drilling down"). In processing a single wafer according to a process, the processing may include a plurality of steps 552, 554, 556, 558, 560, 562. An example graph 550 of FIG. 5 may show a time required for completing various stages of the process, where the time may be plotted for each of the plurality of steps 552, 554, 556, 558, 560, 562. Thus, an x-axis of the graph 550 may represent various stages in the processing of a single wafer, and a y-axis may represent an amount of time required for completing each of the stages.

In a control chart 500 of FIG. 5, wafer-to-wafer interval times may be depicted for a plurality of wafers. By contrast, in the example graph 550 of FIG. 5, the processing of a single wafer is considered, with data being included for each of the different steps 552, 554, 556, 558, 560, 562 that are used in processing the single wafer. Thus, the control chart 500 may depict the collected data for the plurality of wafers at a "macro level," and the example graph 550 may depict the collected data for the single wafer at a "micro level." The micro level depiction of the data may allow for consideration of the data at the higher granularity as compared to the macro level depiction.

Using the micro level depiction of the data in the example graph 550, a bottleneck step for the process may be identified. The bottleneck step may be a particular step of the plurality of steps 552, 554, 556, 558, 560, 562 that limits a throughput of the process more than all of the other steps of the plurality of steps 552, 554, 556, 558, 560, 562. The bottleneck step may be identified by considering the elapsed time (i.e., as plotted on the y-axis of the graph 550) for the various stages of the processing of the single wafer according to the process. For example, control limits may be determined for the graph 550, and elapsed amounts of time that are outside of the range of acceptable values defined by the control limits may be used in identifying the bottleneck step.

Figure 6:
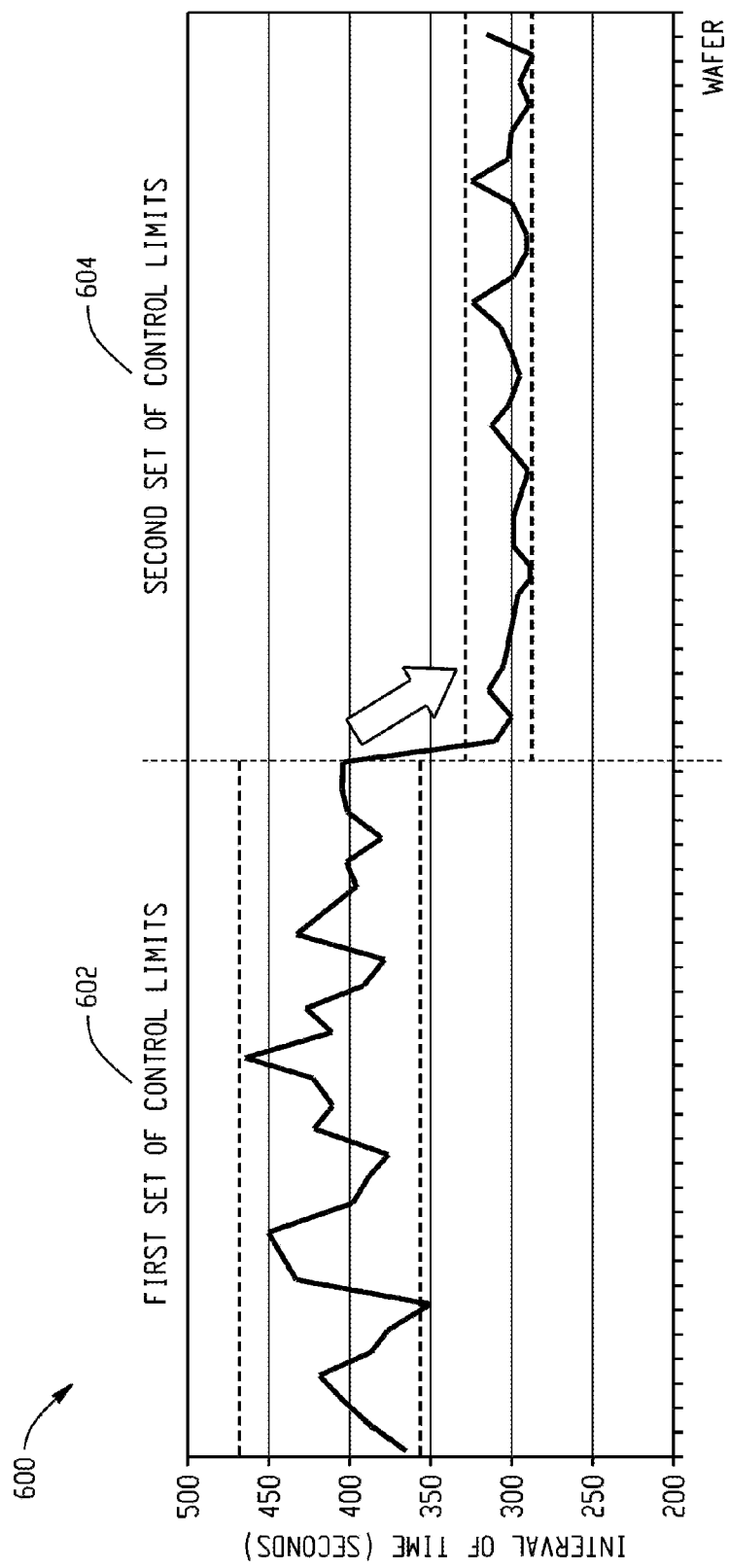
FIG. 6 depicts an example automatic tuning of an SPC system, where the automatic tuning allows a new set of control limits to be determined based on collected data.

FIG. 6 depicts an example automatic tuning of an SPC system, where the automatic tuning allows a new set of control limits to be determined based on collected data. FIG. 6 may depict a graph 600, where an x-axis may represent different wafers of a plurality of wafers, and a y-axis may represent an interval of time, where the interval of time may be the wafer-to-wafer interval time for the different wafers of the x-axis. In the example of FIG. 6, a first set of control limits 602 may be determined based on the processing of a first set of wafers. As an additional, second set of wafers is processed, a second set of control limits 604 may be determined. In this manner, the control limits for the SPC system may be tuned automatically based on additional data that is collected during the processing of the second set of wafers.

The second set of control limits 604 may be for a same chamber and a same recipe (e.g., the change between the sets of control limits 602, 604 may not be due to a change in the processing conditions of the first and second sets of wafers). Further, the second set of control limits 604 may be determined on a real time basis and during a processing of the wafers. The real time determination of the second set of control limits 604 may allow for improved detection of throughput problems. For example, if the second set of control limits 604 is not determined, throughput problems related to the second set of wafers may go unrecognized (e.g., the data collected for the second set of wafers may be considered against only the first set of control limits 602, which may no longer be applicable, and thus, problems in throughput may go undetected). Thus, in the example of FIG. 6, the control limits may be continuously modified based on newly collected data in order to improve the monitoring of process equipment.

Figure 7:
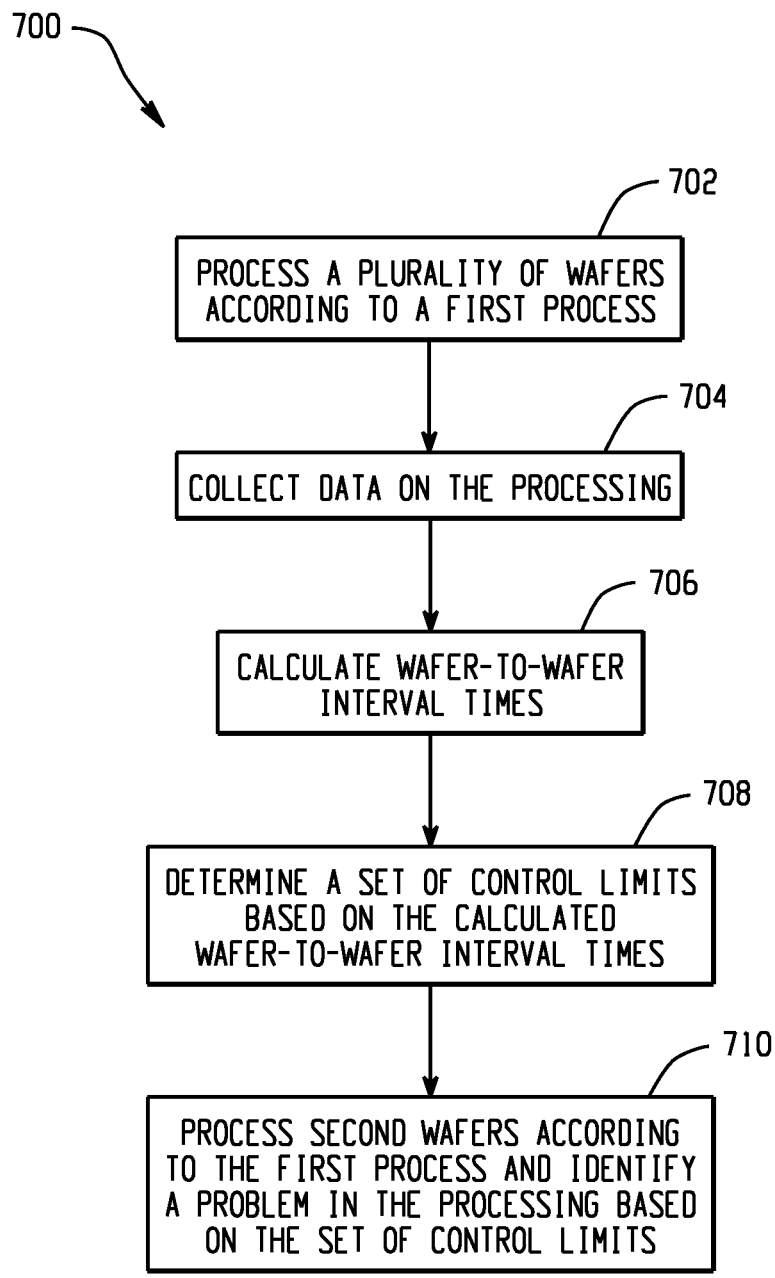
FIG. 7 is a flowchart illustrating an example method for monitoring a process in a semiconductor processing facility.

FIG. 7 is a flowchart 700 illustrating an example method for monitoring a process in a semiconductor processing facility. At 702, a plurality of wafers are processed according to a process. At 704, data on the processing is collected, and the collecting includes, for each wafer of the plurality of wafers, i) determining that a processing event has occurred, and ii) recording a time associated with the processing event. At 706, an amount of time between the recorded times is calculated for consecutively processed wafers of the plurality of wafers. At 708, a set of control limits for the process is determined based on the calculated amounts of time. The set of control limits define a range of acceptable values for the amount of time. At 710, second wafers are processed according to the process. A problem in the processing of the second wafers is identified based on the set of control limits, and the problem is identified as the second wafers are being processed.

The monitoring techniques described above with reference to FIGS. 1A-7 may be used to monitor throughput and productivity across different processing equipment (e.g., across different processing chambers) or across different cleanrooms, where the different processing equipment or the different cleanrooms may be configured to use the same recipes or processing parameters.

The present disclosure is directed to a monitor system and a method for monitoring a process in a semiconductor processing facility. In a method for monitoring a process in a semiconductor processing facility, a plurality of wafers are processed according to a process. Data on the processing is collected, and the collecting includes, for each wafer of the plurality of wafers, i) determining that a processing event has occurred, and ii) recording a time associated with the processing event. An amount of time between the recorded times is calculated for consecutively processed wafers of the plurality of wafers. A set of control limits for the process is determined based on the calculated amounts of time. The set of control limits define a range of acceptable values for the amount of time. Second wafers are processed according to the process. A problem in the processing of the second wafers is identified based on the set of control limits, and the problem is identified as the second wafers are being processed.

In another example, in a method for monitoring a process in a semiconductor processing facility, a plurality of wafers are processed according to a process. A wafer-to-wafer interval time is determined for consecutively processed wafers of the plurality of wafers. The wafer-to-wafer interval time is an amount of time between an occurrence of a processing event for the consecutively processed wafers. A set of control limits for the process is determined based on the determined wafer-to-wafer interval times. The set of control limits includes i) an upper control limit for the wafer-to-wafer interval time, and ii) a lower control limit for the wafer-to-wafer interval time. Second wafers are processed according to the process. A problem in the processing of the second wafers is identified based on the set of control limits, and the problem is identified as the second wafers are being processed.

In another example, a monitor system for a semiconductor processing facility includes semiconductor processing equipment configured to process a plurality of wafers according to a process. The monitor system further includes a controller configured to collect data on the processing of the plurality of wafers. The controller collects, for each wafer of the plurality of wafers i) a first data indicating that a processing event has occurred, and ii) a second data including a time associated with the processing event. The monitor system further includes an event database configured to store the first data and the second data. The event database is further configured to store a wafer-to-wafer interval time for consecutively processed wafers of the plurality of wafers. The wafer-to-wafer interval time is an amount of time between an occurrence of the processing event for the consecutively processed wafers, and the wafer-to-wafer interval time is determined based on the second data. The monitor system further includes a statistical process control (SPC) system configured to determine a set of control limits for the process based on the wafer-to-wafer interval times. The set of control limits define a range of acceptable values for the wafer-to-wafer interval time. A problem in the processing of second wafers according to the process is identified based on the set of control limits, and the problem is identified in a real time manner as the second wafers are being processed.

This written description uses examples to disclose the disclosure, including the best mode, and also to enable a person skilled in the art to make and use the disclosure. The patentable scope of the disclosure may include other examples. It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method for monitoring a process in a semiconductor processing facility, the method comprising:
processing a first set of wafers according to a multiple-step process and collecting data during the processing of the first set of wafers, wherein the data comprises a time for each of the wafers for each step of the multiple-step process;
dynamically tuning a set of control limits for the multiple-step process during the processing of the wafers in an automatic manner, wherein each control limit in the set of control limits is associated with a particular wafer, wherein each control limit in the set of control limits is based on times associated with previously processed wafers in the first set of wafers, and wherein the tuning of each control limit in the set of control limits comprises modifying that control limit multiple times during the processing of the first set of wafers, that control limit being modified on a real-time basis based on the times associated with the previously processed wafers;
identifying a problem in the processing of the wafers based on the set of control limits and by analyzing the data at a macro level of granularity that is indicative of an amount of time required to complete all steps of the multiple-step process;
after the identifying of the problem, identifying a bottleneck step of the multiple-step process by analyzing the data at a micro level of granularity that is indicative of an amount of time required to complete a single step of the multiple-step process, wherein the problem is identified as the first set of wafers are being processed,
wherein the multiple-step process is adjusted based on the identified bottleneck step, and
wherein a second set of wafers are processed based on the adjusted multiple-step process.

2. The method of claim 1, further comprising:
collecting the data during the processing of the first set of wafers, wherein the data is collected on a real time basis, and wherein the problem is identified by comparing the data to the set of control limits or by comparing data derived from the collected data to the set of control limits.

3. The method of claim 2, wherein the derived data is a calculated amount of time associated with consecutively processed wafers of the first set of wafers, and wherein the problem indicates that the calculated amount of time is outside of the range of acceptable values for the amount of time.

4. The method of claim 1, further comprising:
processing a single wafer of the first set of wafers according to the process, wherein the processing of the single wafer includes a plurality of steps, wherein the bottleneck step is a particular step of the plurality of steps, and wherein the bottleneck step limits a throughput of the process more than all other steps of the plurality of steps.

5. The method of claim 4, wherein the micro level analysis is performed at a higher granularity as compared to the macro level analysis.

6. The method of claim 1, wherein the process includes a plurality of steps, and wherein the set of control limits includes, for each step of the plurality of steps, i) an upper control limit for the amount of time, and ii) a lower control limit for the amount of time.

7. The method of claim 1, wherein each step of the plurality of steps corresponds to a different process recipe.

8. The method of claim 1, further comprising:
collecting the data during the processing of the first set of wafers, wherein the collecting includes, for each wafer of the first set of wafers:
determining that a processing event has occurred, and recording a time associated with the processing event; and
modifying the set of control limits based on the recorded times for the first set of wafers.

9. The method of claim 1, further comprising:
outputting an alert signal, wherein the alert signal indicates that the problem has been identified, and wherein the alert signal is output contemporaneously with an occurrence of the problem.

10. The method of claim 1, wherein the problem is indicative of a low throughput for the process.

11. The method of claim 1, the method further comprising:
collecting the data during the processing of the first set of wafers, wherein the data is collected on a real time basis, and wherein the collecting includes, for each wafer:
determining a start of a processing event and a stop of a processing event for that wafer; and
recording times associated with the start of the processing event and the stop of the processing event;
calculating, for each wafer, a time interval between each wafer and a previous wafer based on the recorded times;
modifying, for each wafer, the set of control limits based on calculated time intervals for previously processed wafers, wherein the set of control limits includes, for each step of the plurality of steps, i) an upper control limit and ii) a lower control limit;
comparing, prior to the identifying, the calculated time interval for each wafer to the modified set of control limits for that wafer; and
outputting an alert signal, wherein the alert signal indicates that the calculated time interval (i) exceeds the upper control limit or (ii) falls short of the lower control limit.

12. A monitor system for a semiconductor processing facility, the monitor system comprising:

semiconductor processing equipment configured to process a first plurality of wafers according to a multiple-step process;

a controller configured to collect data during the processing of the first plurality of wafers, wherein the data comprises a time for each of the wafers in the plurality of wafers for each step of the multiple-step process;

an event database configured to store the collected data; and a statistical process control (SPC) system configured to identify a problem in the processing of the first plurality of wafers according to the multiple-step process based on a set of control limits and by analyzing the data collected during the processing of the first plurality of wafers at a macro level of granularity that is indicative of an amount of time required to complete all steps of the multiple-step process, dynamically tune the set of control limits during the processing of the first plurality of wafers in an automatic manner, wherein each control limit in the set of control limits is associated with a particular wafer, wherein each control limit in the set of control limits is based on times associated with previously processed wafers in the first plurality of wafers, and wherein the tuning of each control limit in the set of control limits comprises modifying that control limit multiple times during the processing of the first plurality of wafers, that control limit being modified on a real-time basis based on the times associated with the previously processed wafers, and after the identifying of the problem, identify a bottleneck step of the multiple-step process by analyzing the data at a micro level of granularity that is indicative of an amount of time required to complete a single step of the multiple-step process, wherein the problem is identified in a real time manner as the first plurality of wafers are being processed, wherein the multiple-step process is adjusted based on the identified bottleneck step, and wherein a second plurality of wafers are processed based on the adjusted multiple-step process.

13. The monitor system of claim 12, wherein the data is collected during the processing of the first plurality of wafers in the real time manner, and wherein the problem is identified by comparing the data to the set of control limits or by comparing data derived from the collected data to the set of control limits.

14. The monitor system of claim 12, wherein processing of a single wafer of the first plurality of wafers according to the process includes a plurality of steps, wherein the bottleneck step is a particular step of the plurality of steps, and wherein the bottleneck step limits a throughput of the process more than all other steps of the plurality of steps.

15. The monitor system of claim 14, wherein the micro level analysis is performed at a higher granularity as compared to the macro level analysis.

16. The monitor system of claim 12, wherein the process includes a plurality of steps, and wherein the set of control limits includes, for each step of the plurality of steps, i) an upper control limit for the amount of time, and ii) a lower control limit for the amount of time.

17. The monitor system of claim 12, wherein an alert signal is output, the alert signal indicating that the problem has been identified, and wherein the alert signal is output contemporaneously with an occurrence of the problem.

18. A method for monitoring a process in a semiconductor processing facility, the method comprising:

processing a first plurality of wafers according to a multiple-step process;

collecting data on the processing, wherein the collecting includes, for each wafer of the first plurality of wafers: determining that a processing event has occurred, and recording a time associated with the processing event;

for consecutively processed wafers of the first plurality of wafers, calculating an amount of time between the recorded times;

determining a set of control limits for the multiple-step process based on the calculated amounts of time, the set of control limits defining a range of acceptable values for the amount of time;

processing a second plurality of wafers according to the multiple-step process and collecting second data during the processing of the second plurality of wafers, wherein the second data comprises times associated with previously processed wafers in the second plurality of wafers;

dynamically tuning the set of control limits during the processing of the second plurality of wafers in an automatic manner based on the second data, wherein each control limit in the set of control limits is associated with a particular wafer, wherein each control limit in the set of control limits is based on times associated with the previously processed wafers, and wherein the tuning of the set of control limits comprises modifying the set of control limits multiple times during the processing of the second plurality of wafers, the set of control limits being modified on a real-time basis based on the second data;

identifying a problem in the processing of the second plurality of wafers based on the set of control limits and by analyzing the second data at a macro level of granularity that is indicative of an amount of time required to complete all steps of the multiple-step process;

after the identifying of the problem, identifying a bottleneck step of the multiple-step process by analyzing the second data at a micro level of granularity that is indicative of an amount of time required to complete a single step of the multiple-step process, wherein the problem is identified as the second plurality of wafers are being processed, wherein the multiple-step process is adjusted based on the identified bottleneck step, and wherein a third plurality of wafers are processed based on the adjusted multiple-step process.

19. The method of claim 18, wherein
(i) the processing of the first plurality of wafers, (ii) the collecting of the data, and (iii) the tuning of the set of control limits occur simultaneously.

20. The method of claim 18, further comprising:
collecting the second data during the processing of the second plurality of wafers, wherein the second data is collected on a real time basis, and wherein the problem is identified by comparing the second data to the set of control limits or by comparing data derived from the second data to the set of control limits.

* * * * *